(12) United States Patent
Carle

(10) Patent No.: US 6,223,881 B1
(45) Date of Patent: May 1, 2001

(54) ACCUMULATOR FOR MOLDS

(75) Inventor: Giovanni Marco Carle, Milan (IT)

(73) Assignee: Carle & Montanari S.p.A., Milan (IT)

( * ) Notice: Subject to any disclaimer, the term of this patent is extended or adjusted under 35 U.S.C. 154(b) by 0 days.

(21) Appl. No.: 09/298,875

(22) Filed: Apr. 26, 1999

(30) Foreign Application Priority Data

Apr. 30, 1998 (IT) ............................................. MI98A0944

(51) Int. Cl.[7] .................................................. B65G 37/00
(52) U.S. Cl. ........................ 198/347.3; 425/150; 425/454
(58) Field of Search ................... 425/DIG. 108, 425/454, 150, 404, 446; 198/347.1, 347.3, 347.4

(56) References Cited

U.S. PATENT DOCUMENTS

| | | | |
|---|---|---|---|
| 4,178,144 | * 12/1979 | Tabler | 425/150 |
| 5,176,242 | * 1/1993 | Wegscheider | 198/347.3 |
| 5,253,743 | * 10/1993 | Haas, Sr. et al. | 198/347.1 |
| 5,415,280 | * 5/1995 | Balboni et al. | 198/435 |
| 5,473,978 | * 12/1995 | Colombo | 99/443 C |
| 5,567,104 | * 10/1996 | Focke et al. | 414/331 |
| 5,636,722 | * 6/1997 | Koop | 198/347.1 |

* cited by examiner

Primary Examiner—Harold Pyon
Assistant Examiner—Emmanuel S. Luk
(74) Attorney, Agent, or Firm—Kirschstein et al.

(57) ABSTRACT

Chocolate-filled molds are conveyed to a workstation for releasing the chocolate from the molds, and the empty molds are simultaneously conveyed away from the workstation, by an arrangement which includes a pair of up and down elevators which convey filled and empty molds to a transfer device displaceable up and down in synchronism with the movement of the elevators. The transfer device transfers the filled and empty molds only when the transfer device is in a rest position.

7 Claims, 6 Drawing Sheets

ACCUMULATOR FOR MOLDS

BACKGROUND OF THE INVENTION

The present invention relates to an accumulator for molds for use in a system for making confectionery articles, such as chocolate articles, and, more specifically, an accumulator for accumulating molds free of their driving means and operating according to a first-in-first-out logic in which, the first mold entering the accumulator will be the first mold exiting said accumulator.

As is known in the prior art, for making confectionery articles, such as chocolate bars or chocolates, patterns or molds, including a plurality of recesses which are filled by a fluid confectionery mass and then subjected to a solidifying process in refrigerating systems are conventionally used.

These confectionery article making systems are provided with system parts or stations operating with different operating speeds.

For example, due to production quality reasons, the patterning, cooling and mold releasing stations are operatively coupled with one another and, accordingly, they perform synchronous movements, said stations continuously operating to have a number of operating interruptions as small as possible.

For example, in a refrigerating system it is indispensable to hold the confectionery articles at preset temperatures for strictly constant times, to provide an end product having a desired quality.

On the contrary, the packaging or paperwrapping of said confectionery articles is carried out by systems having independent driving means.

In particular, the operating speed of a wrapping unit may vary from 0% to 130% of a constant operating rate of said molding or patterning, cooling and releasing stations.

The mentioned wrapping unit operating rate variations are caused, for example, by interruptions necessary for supplying and replacing packaging materials, as well as for maintenance or jamming reasons.

Thus, because of the mentioned different operating rates of the operating unit or stations provided on a same making line, excess amounts of products are made, which must necessarily be accumulated.

At present, for allowing a continuous operation, between the releasing station and the wrapping machines, released confectionery article accumulating stations are provided, in which the mold released products are handled either individually or by rows or courses of products, for preventing product damage and product jamming which can lock the system.

For preventing possible jammings or "packings" between the confectionery product rows coming from the same mold and possible damages to the products, it would be indispensable to handle each individual product row. For performing such a handling operation, conventional accumulating devices have been designed, which comprise very complex handling mechanisms taking the confectionery articles from conveyor means and depositing them on suitable storing plates or slabs, anchored to conveyor and storing systems, arranged, for example, off-line.

Said prior accumulators have the further drawback that the made confectionery products are held in a waiting for wrapping condition in the accumulator, upon releasing from the mold, thereby said products can be polluted and damaged.

The above mentioned accumulators are usually arranged downstream of the patterning or molding line, between the releasing section and the wrapping line.

The above mentioned approach, in addition to problems related to the released product handling and storing operations (such as damages, pollution, contamination and the like) present the further problem of properly handling the confectionery product supporting plates from a storing position to a loading position thereof.

Moreover, prior continuous line systems have the further drawback that it is necessary to perform, upon sending the plate supported products to the paper wrapping machines, a proper managing of the empty return plates. Thus, in order to control the empty plates, further accumulators must be provided in the return branch of the making line.

Accordingly, prior accumulating stations for accumulating the full and empty plates have a very large overall size.

SUMMARY OF THE INVENTION

Thus, the aim of the present invention is to overcome the mentioned drawbacks of the prior art and facilitate the storing of the confectionery products by a very simple construction and small size accumulator.

This aim of the invention is achieved by an accumulator for molds, for use in a system for making confectionery articles, characterized in that, near a bottom and a top portion of said accumulator horizontal conveyor means for forward feeding full molds and respectively returning empty molds are provided, that at the inlet of said full molds into said accumulator are successively arranged, between said horizontal conveyor means, controllable vertical conveyors which can be controllably driven for handling said molds, that, before the outlet of said full molds from said accumulator, between said horizontal conveyor means, controllable vertical conveyors which can be controllably driven for handling said molds are further arranged, that between said vertical conveyors a controlled horizontal conveying device for horizontally driving said molds is arranged, and that said horizontal conveyor device can be controllably driven and located along a vertical axis.

The accumulator according to the invention is arranged inside the confectionery article making line to directly handle the molds. Accordingly, the handling mechanisms are very simple construction wise, since they must not handle the mold released products and must not deflect the confectionery articles from their making line and reintroduce again them into said line.

Thus, the invention allows to greatly reduce the space occupied by the accumulating system, since a separated accumulating station or accumulator is not required for the empty plates, thereby providing a further constructional simplification.

A particular advantage is that, in this system, the molds instead of the confectionery articles are handled, thereby the confectionery articles, held in the mold recesses, will be less exposed to possible polluting agents and handling damages.

Moreover, since the accumulator directly manages or handles the molds, said accumulator can be arranged in the making line upstream of the mold releasing apparatus. Thus, it will be possible to control the releasing station depending on the requirements of the following paper wrapping stations. In this manner, from said molds only the articles which are immediately sent to the wrapping operation will be released, thereby reducing to a minimum a possible polluting and damaging of said articles.

Furthermore, since the accumulator is arranged between the refrigerator and the mold releasing station, it can be easily integrated in the managing logic designed for managing or controlling the overall making line.

Accordingly, the mold releasing station is physically separated from the patterning or molding line driving unit, and provided with a dedicated driving assembly, independently from the patterning or molding system and synchronously operated with the paper wrapping units.

The movements of the mold accumulator are synchronized or timed with the upstream station (the refrigerator) and the downstream station (the releasing station). Thus, the vertical conveyors, which are successively arranged at the accumulator full mold inlet, are operatively coupled to the driving devices of the station arranged upstream of the confectionery article making system, for example the refrigerator.

The vertical conveyors, arranged before the accumulator full mold output are, on the contrary, operatively coupled to the driving device of the stations arranged downstream of said accumulator in said confectionery article making system, for example the releasing station.

For allowing the molds to be reintroduced with a spaced relationship into the making line, the horizontal conveyor means provided for evacuating said molds from said accumulator are provided with a releasing device for step by step releasing said molds.

For taking the molds from the horizontal conveyors and supporting said molds in said accumulator, the vertical conveyors are arranged on the sides of the horizontal conveyor means and extended along the overall height of said accumulator.

For easily taking the sets of molds from the horizontal conveyor means, the vertical conveyors are extended beyond the conveyor plane of the horizontal conveyor means.

For taking the molds from the horizontal conveyor means and supporting said molds inside said accumulator in a construction-wise simple manner, laterally of said horizontal conveyor means, and rotatably supported by the box-like casing of said accumulator, a plurality of shafts are provided, thereon a plurality of chain guiding and driving pinions are keyed; mold supporting and taking pans cantilever-wise extending from the chains, said pans being arranged along said chains with an equal spacing relationship.

The vertical conveyors arranged at the accumulator inlet take the full molds or full mold sets from the forward feeding horizontal conveyor means and, by displacing or driving said molds in a vertical plane, provide an upward mold column or stack. At the top, the vertical conveyors release the empty molds or empty mold sets on said return horizontal conveyor means.

The vertical conveyors provided before said accumulator outlet will release the full molds or full mold sets (conveyed by the upward vertical conveyors) on the forward feeding horizontal conveyor means exiting the accumulator and will take the empty molds from the return horizontal conveyor means arranged at the top, thereby providing a downward mold column or stack.

The even arrangement of said pans along the chains, and the provision of a conveyor on both sides of the horizontal conveyor means will provide a plurality of recesses for housing said molds therein.

For handling the vertical conveyors, the shafts of said pinions are operatively coupled to controllably driven motor reducing units.

For synchronizing the movement of the vertical conveyors with the production line either upstream or downstream of the accumulator, the motor reducing unit control unit is operatively coupled to the production line driving devices.

For transferring the mold sets between the vertical conveyors, the horizontal translation or driving device is so controlled as to actuate the transfer as said vertical conveyors are in a rest condition.

For transferring the mold sets between the vertical conveyors, the horizontal driving device is provided with a carriage operatively coupled to the vertical axis. From said carriage parallel arms supporting chain guiding and driving pinions extend laterally so as to pass across said vertical conveyors. Transversely of said chains, mold driving finger pusher devices are provided.

Advantageously, the pinions guide the drive belts which are provided with cross arranged finger pushers.

For allowing the finger pushers to be synchronously driven, the corresponding pinions supported by said arms are keyed on shafts arranged transversely of said arms.

For controllably driving the finger pushers, the pinion shafts are operatively coupled to a controllably driven motor reducing unit.

For allowing the horizontal driving device to be located along the vertical axis, worm screw shafts are arranged between the vertical conveyors, the axes whereof extend vertically and are supported by the box-like accumulator casing or framework. Scrolls on said worm shafts are rigid with a carriage of the horizontal translation device.

For controlling the vertical displacement or location of the horizontal driving device, the worm shafts are operatively coupled to motor reducing units which are synchronized with one another and feedback controlled by a worm shaft revolution speed transducer.

For arranging the horizontal driving device at a proper height and displacing the molds from a vertical conveyor to the other, as said conveyors are in a rest condition, the horizontal driving device control unit is operatively coupled to the vertical conveyor driving devices.

For adjusting the vertical position of the horizontal driving device depending on the number of molds required by the making line, the horizontal driving device control unit is operatively coupled to a transducer or sensor for sensing the presence of molds on the vertical conveyors, said transducer or sensor being arranged under the horizontal driving device.

Thus, based on an evaluation of the presence of molds in the space underlaying the horizontal driving device as provided in the downward vertical conveyors, it is possible to adjust the raising of said horizontal driving device thereby causing it to be properly located with respect to the vertical conveyors where a free space for receiving the mold sets coming from the upward or raising vertical conveyors is provided.

On the contrary, by evaluating the presence of molds in the space underlaying the horizontal driving device as provided in the upward directed or raising vertical conveyors, it is possible to adjust the vertical position of the downward horizontal conveyor device, thereby allowing a presence of mold sets on said upward vertical conveyors, to be transferred to the downward vertical conveyors.

This type of adjusting allows to automatically achieve an equilibrium condition set by a number as small as possible of full molds present in the accumulator.

BRIEF DESCRIPTION OF THE DRAWINGS

The subject matter of the present invention will be disclosed hereinafter in a more detailed manner, with reference to a merely exemplary embodiment thereof, shown in the accompanying drawings, where.

DESCRIPTION OF THE PREFERRED EMBODIMENT

Figure 1:
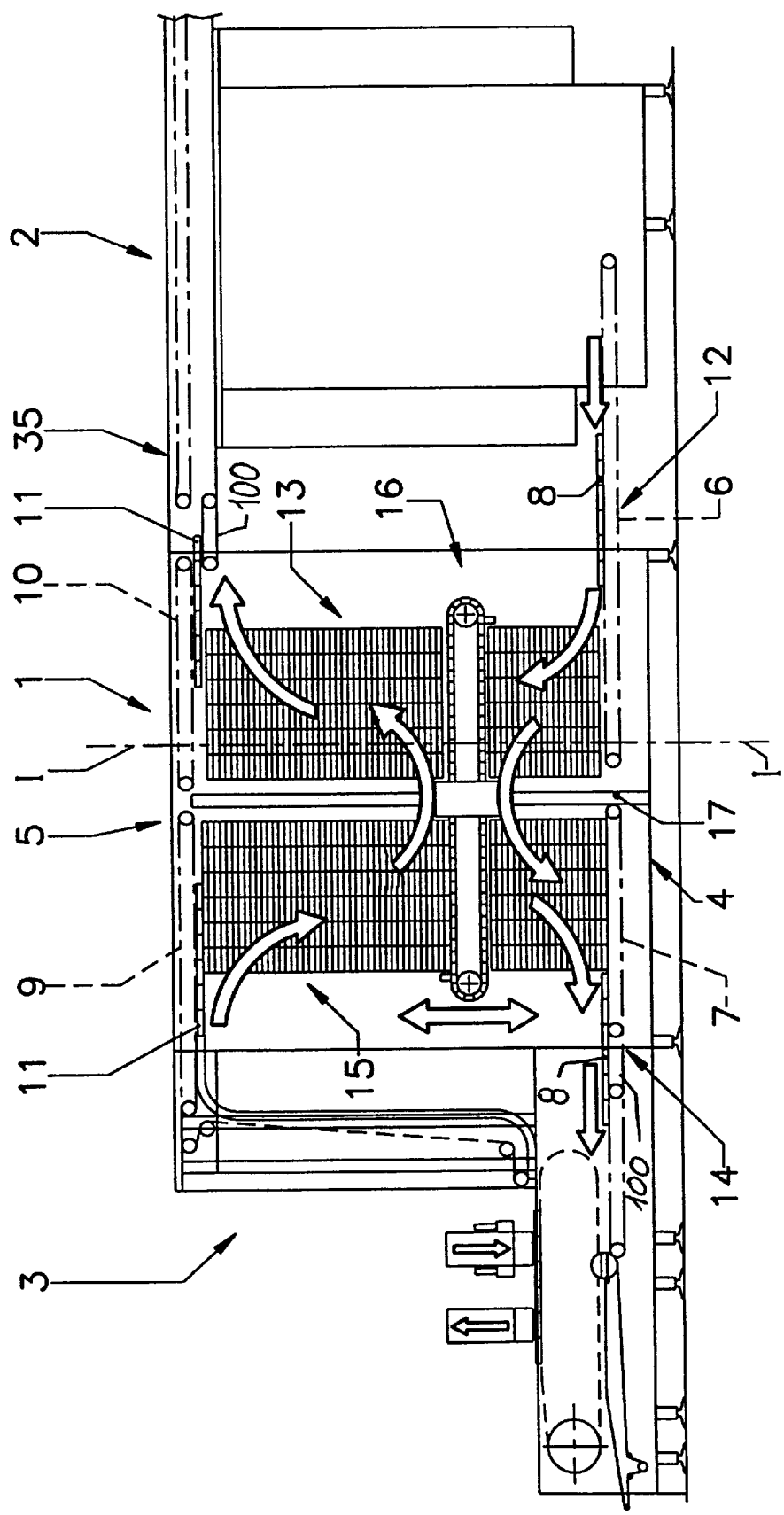
FIG. 1 is a partially cross-sectioned side view of an accumulator arranged between a refrigerator and a releasing station.

FIG. 1 shows an accumulator for molds, generally indicated by the reference number 1, arranged in a confectionery article making system.

More specifically, the accumulator 1 is arranged after a refrigerating unit or refrigerator 2 and before a releasing station of machine 3.

The accumulator 1 allows an accumulation both of the full molds of the forward feeding line, and of the empty molds of the return line, as it will be disclosed in a more detailed manner hereinafter.

Horizontal conveyor means 6, 7, 9 and 10 connect the making or production line with said accumulator 1 by entering the box-like casing of said accumulator 1.

Near the bottom portion 4 of the accumulator 1 are provided, in succession, horizontal conveyor means 6, 7 for forward feeding the full molds 8.

Near the top portion 5 are successively arranged horizontal conveyor means 9, 10 for the return of the empty molds 11.

In succession at the inlet 12 of said accumulator 1 for the full molds 8, between the horizontal conveyor means 6, 10, vertical conveyors, generally indicated by 13, are provided. Said vertical conveyors 13 can be controllably driven in order to displace or drive in a vertical plane the molds 8, 11.

For example, the vertical conveyors 13 upward drive said molds 8, 11.

Before the outlet 14 of the full mold 8 accumulator 1, between the horizontal conveyor means 9, 7, vertical conveyors, generally indicated by 15, are provided. The vertical conveyors 15 can be controllably driven for driving in turn the molds 8, 11. For example, said vertical conveyors 15 drive or displace said molds 8, 11 through a continuously descending path, synchronously with the making line downstream of the accumulator 1.

The vertical conveyors 13 drive or displace said molds 8, 11 to form either a upward or a downward column or stack of said molds 8, 11, said mold columns or stacks being driven synchronously with the making line either upstream or downstream of the accumulator 1.

Between the adjoining vertical conveyors 13, 15 a horizontal driving device, generally indicated by 16, is provided. The horizontal driving device 16 drives the full molds 8 from the upward vertical conveyors 13 to the downward vertical conveyors 15 and, simultaneously, transfers said empty molds 11 from the downward vertical conveyors 15 to the upward vertical conveyors 13.

Said horizontal driving device 16 can be controllably displaced or driven and located along a vertical axis 17.

FIGS. 4 to 7 show the constructional details of the main components forming the accumulator 1.

Figure 4:
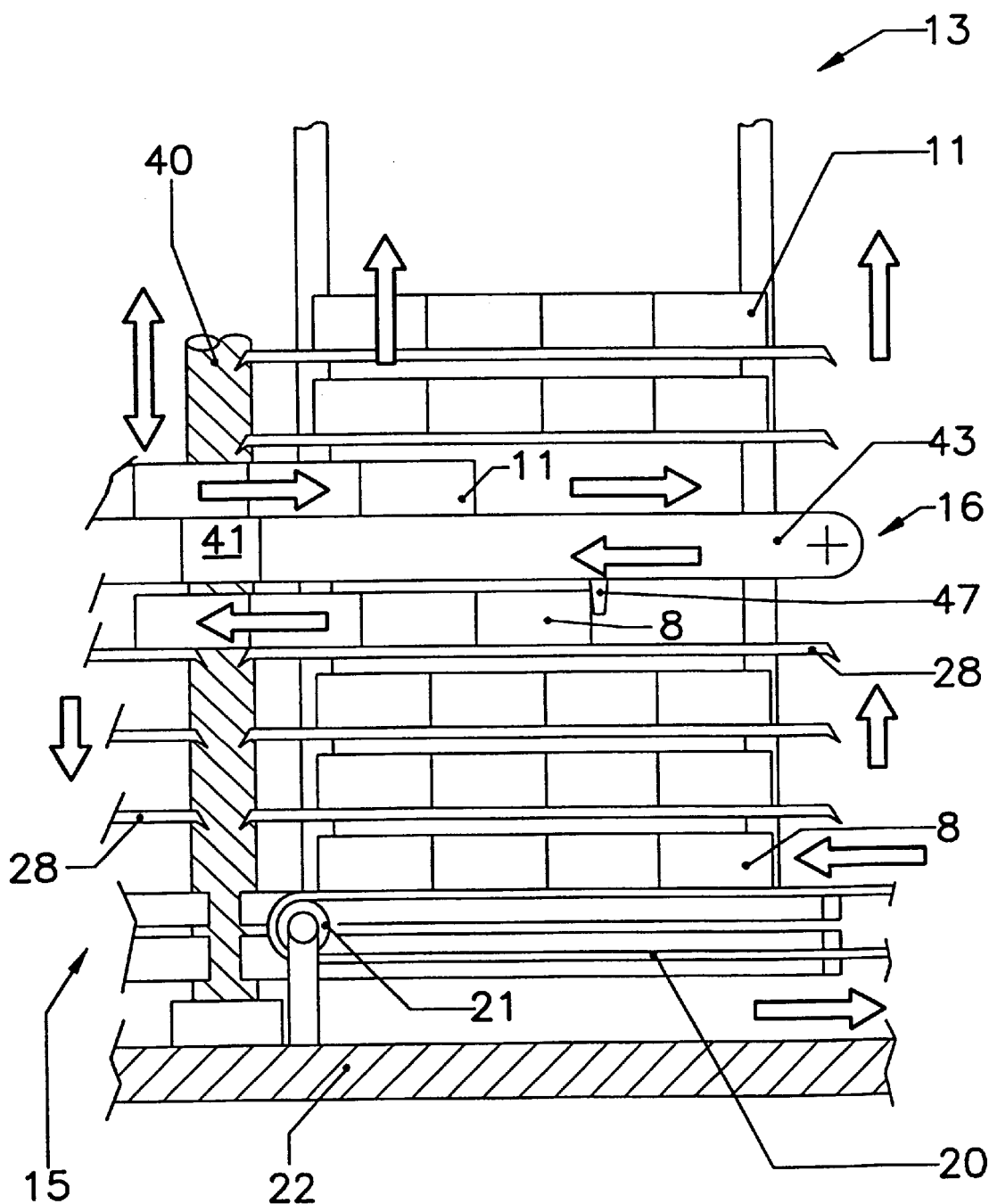
FIG. 4 is a further partially cross-sectioned side view illustrating the vertical conveyors and the mold horizontal driving device arranged therebetween.

FIG. 4 shows an end or inlet portion 20 of the horizontal conveyor means 6 for the full molds 8 entering the accumulator 1.

For example, pinions or pulleys 21 are supported on the bottom plate 22 of the box-like framework or casing 23 of the accumulator 1, said pinion guiding and driving chains or belts supporting said full molds 8.

Preferably, the horizontal conveyor means are provided with the chains driven and guided by the pinions 21 having cross ridges or guiding pushers. In said conveyors 6, 9, said molds are engaged in a conveyor or transport chain between pushing pawls (not shown).

The molds 8 are taken from the conveyors 6, 9 which are step by step driven.

During the transfer from the upward vertical conveyors 13 to the downward vertical conveyors 15, as performed by said horizontal driving device 16, the molds 8 are arranged in a stacked arrangement by said device 16.

Likewise is performed the transfer of the empty molds 11 from the downward vertical conveyors 15 to the upward vertical conveyors 13.

The downward vertical conveyors 15 and the upward vertical conveyors 13 are provided, near the outlet of said accumulator and are interfaced with the other portions of the system, with timing or synchronizing devices 100 receiving the stacked molds and releasing them, by step by step, on the horizontal conveyors of the devices adjoining the accumulator (respectively the releasing and refrigerating devices).

Laterally of the end portion 20 of the horizontal conveyor means, vertical conveyors 13 are provided, which extend through the overall length of the accumulator 1.

Figure 5:
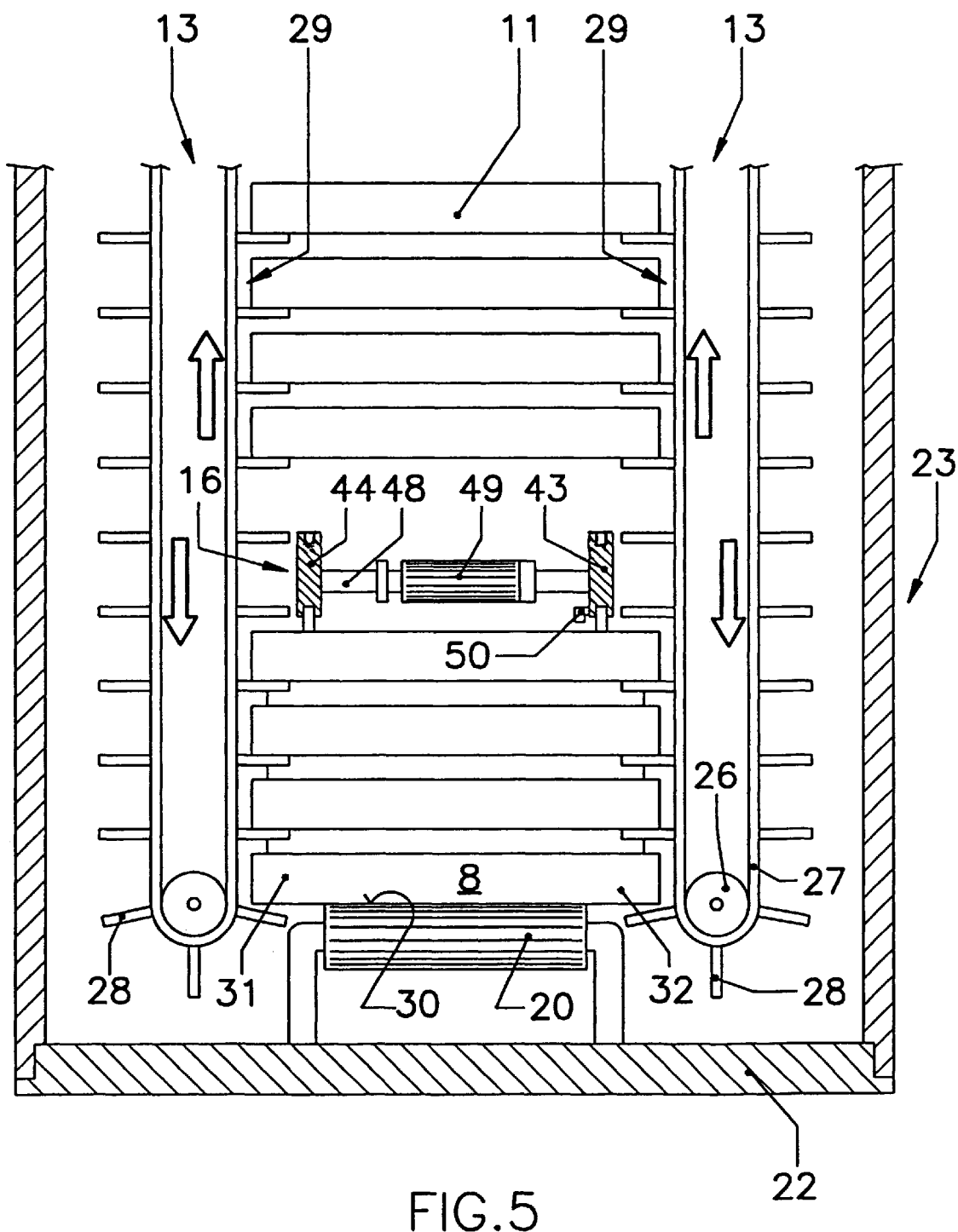
FIG. 5 illustrates a detail of a cross section of the accumulator of FIG. 1 (taken along the line I—I)
Figure 6:
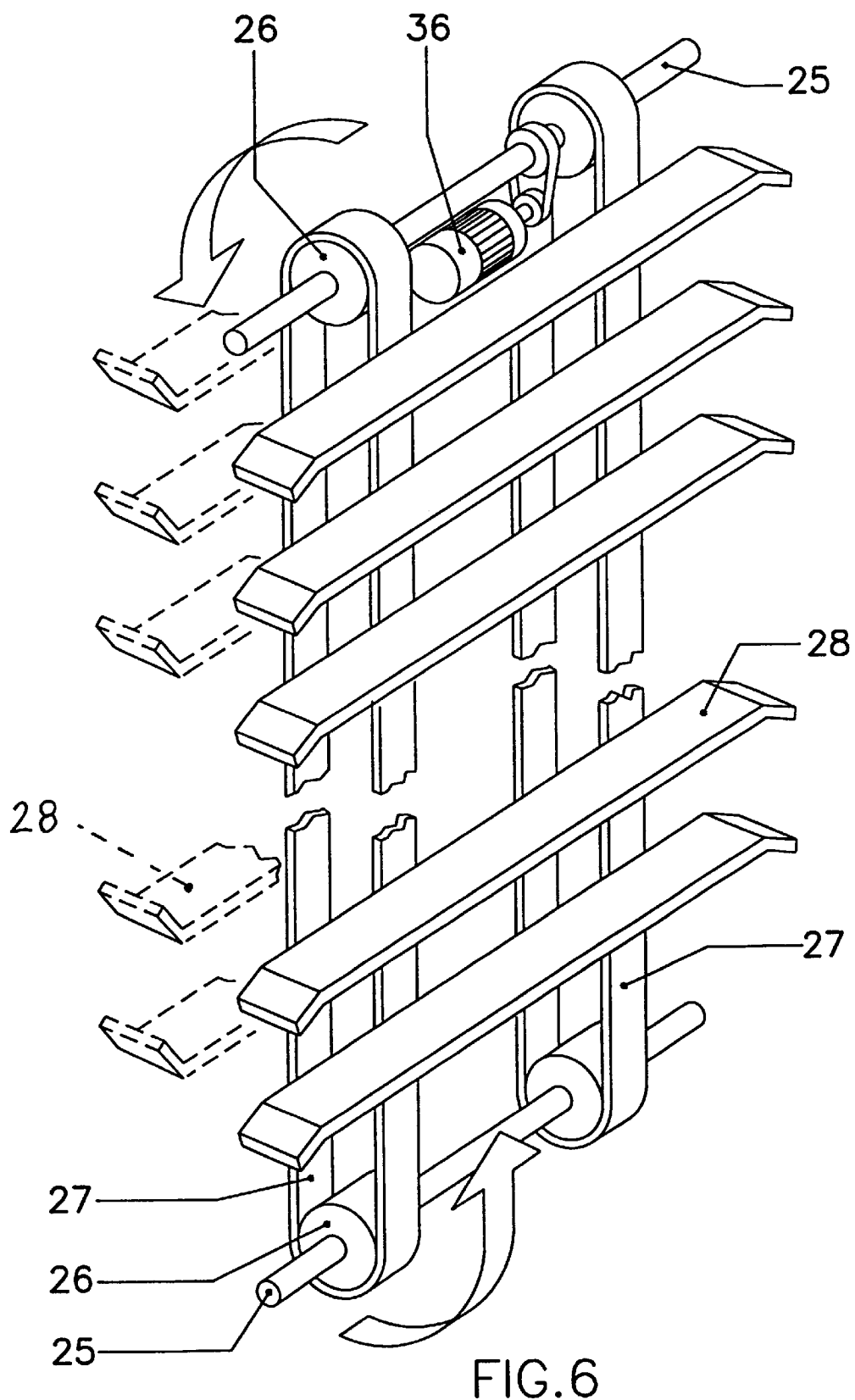
FIG. 6 is a schematic axonometric partially cross-section view illustrating a vertical conveyor.
Figure 7:
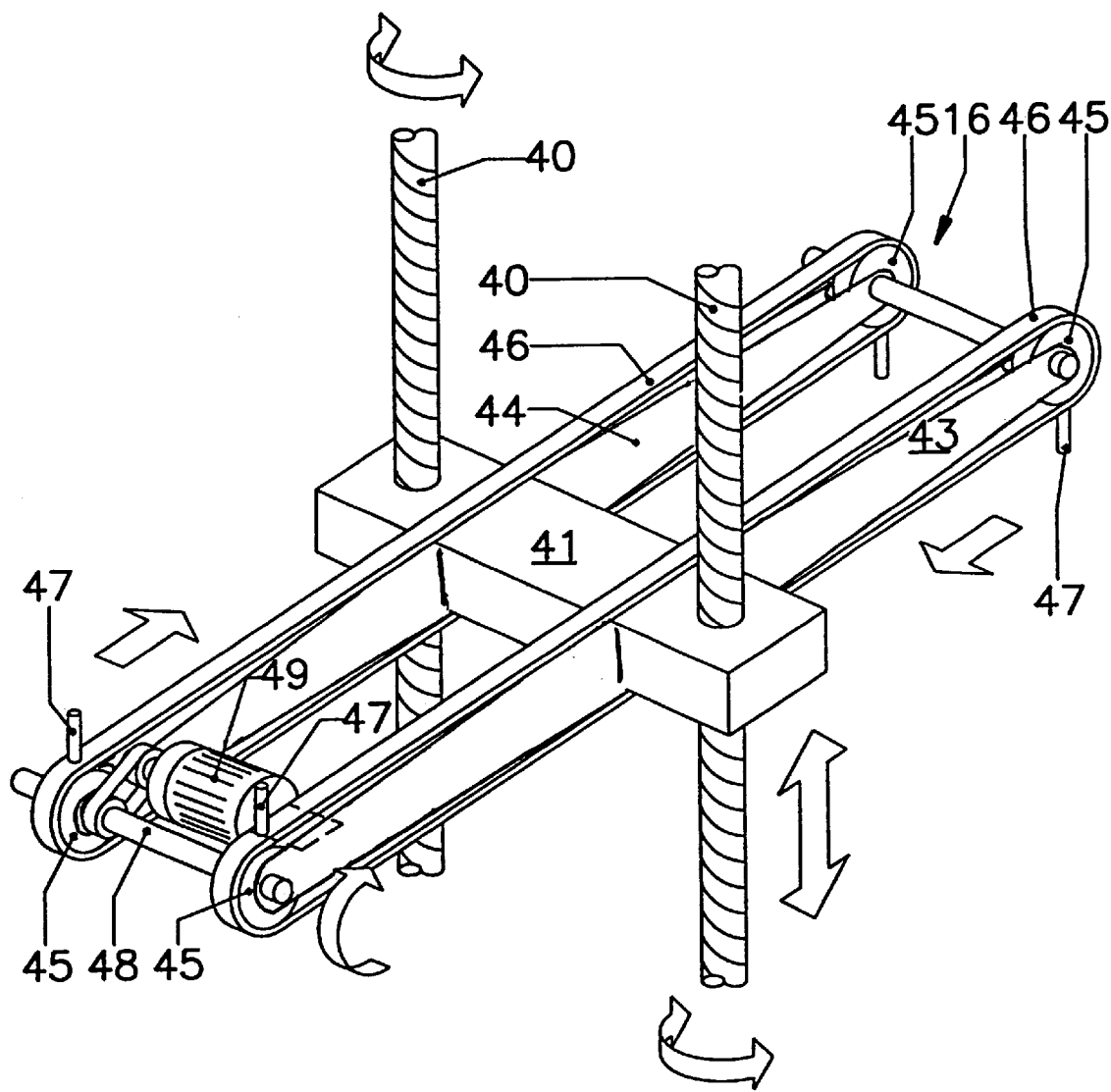
FIG. 7 is a further schematic axonometric partially cross-sectioned view illustrating the mold horizontal driving device.

As is shown in FIGS. 5 and 6, said vertical conveyors are provided, at the top and bottom thereof, with shafts rotatably supported by the accumulator box-like casing. Said shafts support pinions or pulleys for guiding and driving corresponding chains 25, 26, 27 or, in a modified embodiment, corresponding belts.

Along said chains 27, pans 28 for receiving and supporting said molds 8, 11 are provided, said pans being arranged in an equispaced relationship along said chains 27 thereby providing recesses 29 for engaging therein said molds 8, 11.

The vertical conveyors 13 extend under the conveying plane 30 of the horizontal conveyor means 6, 7, 9, 10.

Thus, as the pan 28 supporting chains 27 turn about the pinion 26, they will engage and rise the end portions 31, 32 of said molds 8, 11 laterally projecting from said horizontal conveyor means 6, 7, 9, 10.

Likewise, the vertical conveyors 13 extend above the plane defined by said horizontal conveyor means 9, 10, thereby allowing the pushers engaged on the horizontal conveyor means 9, 10 to transfer or drive the molds 11 to the return line 35 (FIG. 1).

The pinion shafts are operatively coupled to controllably driven motor reducing units 36.

Advantageously, the motor-reducing unit 36 control unit is operatively coupled to the making line driving devices (not shown).

FIGS. 4, 5 and 6 show the mold horizontal conveyor device 16.

Worm shafts 40 are supported with their axes vertically arranged between the vertical conveyors 13, 15 by the box-like casing 23 of said accumulator 1.

Scrolls, for example ball recirculation scrolls, are operatively coupled to said worm shafts 40 (not shown).

Said scrolls are rigid with a carriage 41 for vertically driving and locating the horizontal driving device 16.

The worm shafts 40 are operatively coupled to motor reducing units which are synchronized with respect to one another and feedback controlled by a worm screw 40 revolution speed transducer or sensor (not shown).

In a modified embodiment of the invention (not shown), a plurality of uprights provided with corresponding racks are provided between the vertical conveyors 13, 15. A carriage 41 is provided with pinions meshing with said racks arranged laterally and cantilever-wise, said pinions being operatively coupled to a controllably driven motor-reducing unit.

From said carriage 41 parallel arms 43, 44 laterally extend so as to cross the vertical conveyors 13, 15.

Said parallel arms 43, 44 support pinions or pulleys 45 for guiding and driving corresponding chains 46 or belts. Finger pushers 47 transversely extend from said chains 46, said finger pushers 47 provided on parallel chains 46 being aligned with one another.

As the horizontal driving device 16 is in a rest or stopped condition, the finger pushers 47 are arranged at the ends of said arms 43, 44. Thus, said finger pushers 47 can be laterally born by said molds 8, 11 for pushing said molds from the pan 28 of the upward vertical conveyors 13 to the pan 28 of the downward vertical conveyors 15 or vice versa.

At the bottom of said horizontal driving device 16 mold sensors or transducer 50 are provided for detecting the presence of said molds. For example, proximity sensors or optical barrier transducers are coupled to the bottom portion of said arms 43, 44 in order to detect the presence of said molds 8 under the horizontal device 16 both at the recesses defined by the pans 28 of the upward vertical conveyors 13 and at the recesses 29 defined by the pans 28 of the downward vertical conveyors 15.

The corresponding pinions 45 provided on said arms 43, 44 are coupled to one another by coupling shafts 48.

The pinion 45 coupling shafts 48 being operatively coupled to a controllably driven motor reducing unit 49.

The operation of the accumulator 1 will be disclosed hereinafter with reference to FIGS. 1, 2, 3, 4 and 5. The molds 8 filled with confectionery product exiting the refrigerator 2 are conveyed, by the horizontal conveyor means 6, to the inlet 12 of the box-like casing 23 of said accumulator 1.

Inside said box-like casing 23, said full molds 8 are taken by the vertical conveyors 13 of said accumulator 1.

The movement or displacement of the full molds 8 conveyed by the horizontal conveyor means 6 is an intermittent movement.

In fact, the horizontal conveyor means 6 are operatively coupled to the making line of the releasing machine, where the molds must be stopped for a sufficient time to fill the recesses thereof by said confectionery product.

By an intermittent displacement, though phase offset with respect to said horizontal conveyor means 6, the vertical upward conveyors 13 will take up by the pans 28 the sets of full molds 8 which are present at the bottom thereof. By raising the full mold 8 set present at the bottom of the vertical conveyors, a new full mold 8 set is allowed to enter the accumulator 1.

By said intermittent movement, the vertical conveyors 13 will raise the full mold 8 sets provided in said recess 29 formed by said pans to a region near said horizontal translation or driving device 16.

Said horizontal driving device 16, in particular, will be arranged at such a height as to assure that in the downward vertical conveyors 15 an empty recess 29 be provided for transferring the full mold 8 set provided in the upward or raising column or stack.

Said mold horizontal driving device 16 will drive or displace from the upward column to the downward column, exclusively in a case in which the proximity or optical barrier transducers 50 detect a three recess 29 in the downward column immediately under the horizontal driving device 16. Otherwise, said horizontal driving device 16 will be raised with a movement synchronized with that of the upward vertical conveyors 13.

In fact, the servomotors operatively coupled to said worm screws 40, by receiving a signal from said transducers or sensors 50 detecting the presence of full molds 8 under the horizontal driving device 16 in the downward column, will rotatively drive the ball recirculation screws 40 by causing the carriage 41 to be synchronously raised with the upward column.

As the vertical conveyors 13, 15 are in a rest or stop condition, the motor reducing unit 49 will drive the pinions 45 thereby causing the finger pushers 47 to contact the outermost side surface of the full mold 8 set, and causing in turn said full mold 8 set to slide from the pans 28 of the upward vertical conveyors 13 to the pans 28 of said downward vertical conveyors 15.

By a downward intermittent movement, the vertical conveyors 15 will bring the full mold 8 sets onto the horizontal conveyors means 7 for evacuating said molds from said accumulator 1.

Before sending said full molds 8 to said releasing machine 3, a synchronizing device will separate the mold 8 set by arranging them on the conveyor line of the releasing machine 3 at even distances.

The releasing machine conveyor line, after having released the confectionery products from said molds, will be brought near the top portion of the accumulator 1 where are provided the horizontal conveyor means 9 entering the box-like casing 23 of said accumulator 1.

The empty molds 11 are in turn conveyed by the horizontal conveyor means 9 to the top of the vertical downward conveyors where they are taken by the pans 28 and driven toward the horizontal driving device 16.

As the empty mold 11 set arrives at a region near the arms 43, 44 of the horizontal device 16, said mold set will be displaced by said finger pushers 47 of the pans 28 of the vertical downward conveyors 15 to the pans 28 of the upward vertical conveyors 13.

Said vertical upward conveyors 13 will bring the empty mold 11 set to the top of the accumulator 1, where they will be urged by the horizontal conveyor means 10 toward the releasing station return line (not shown).

If the releasing and molding or patterning stations operate with the same speed, then the operating cycle will be held like that which has been above disclosed.

On the contrary, if the releasing station operates with an operating rate or speed less than that of the molding or patterning station, then the downward vertical conveyors 15 will decrease their driving rate thereby returning to the conveyor line of the releasing machine 3 a less amount of molds.

The horizontal driving or transfer device 16 for said molds is raised synchronously with the upward vertical conveyors 13 which will raise a mold 8 set from the underlaying horizontal conveyor means 6. The horizontal translation device 16 is raised so as to find a free space or recess 29 in said downward vertical conveyors 15, to transfer thereinto the full mold 8 set.

Figure 3:
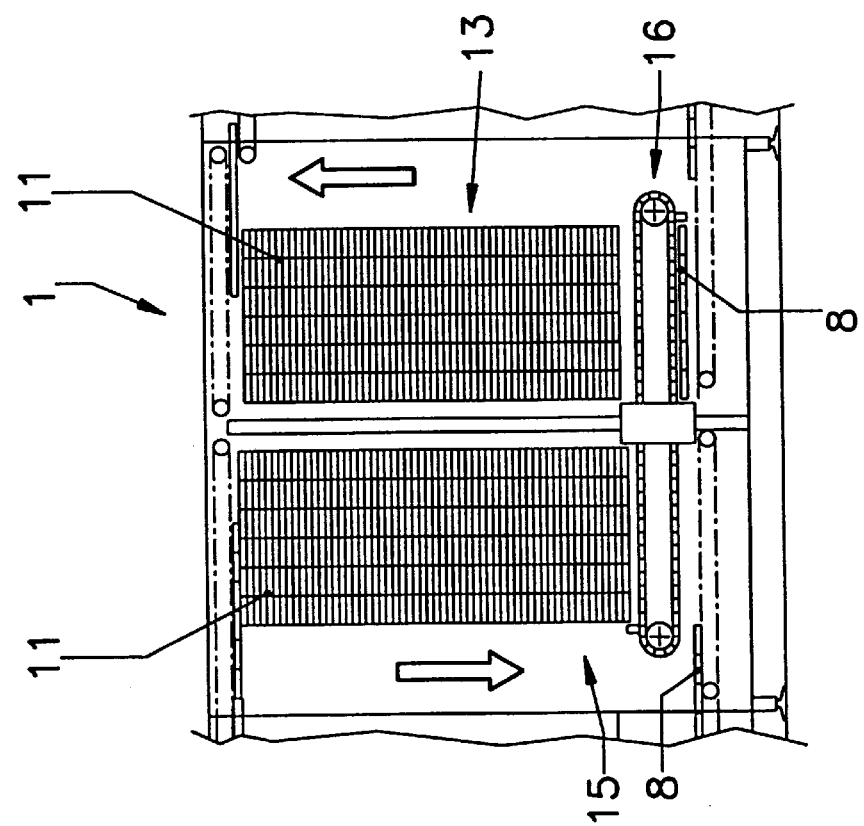

Thus, the level of the full mold 8 will be evenly increased to the same value both in the upward vertical conveyors 13 and in the downward vertical conveyors 15, thereby providing the accumulating or stacking effect (FIG. 3).

As the releasing section or station 3 operates with an operating rate greater than that of the patterning or molding station, then the downward vertical conveyors will release the full mold 8 sets with a greater rate. Accordingly, the vertical downward conveyors will tend to empty quicker than the supplying of the upward vertical conveyors 13.

Figure 2:
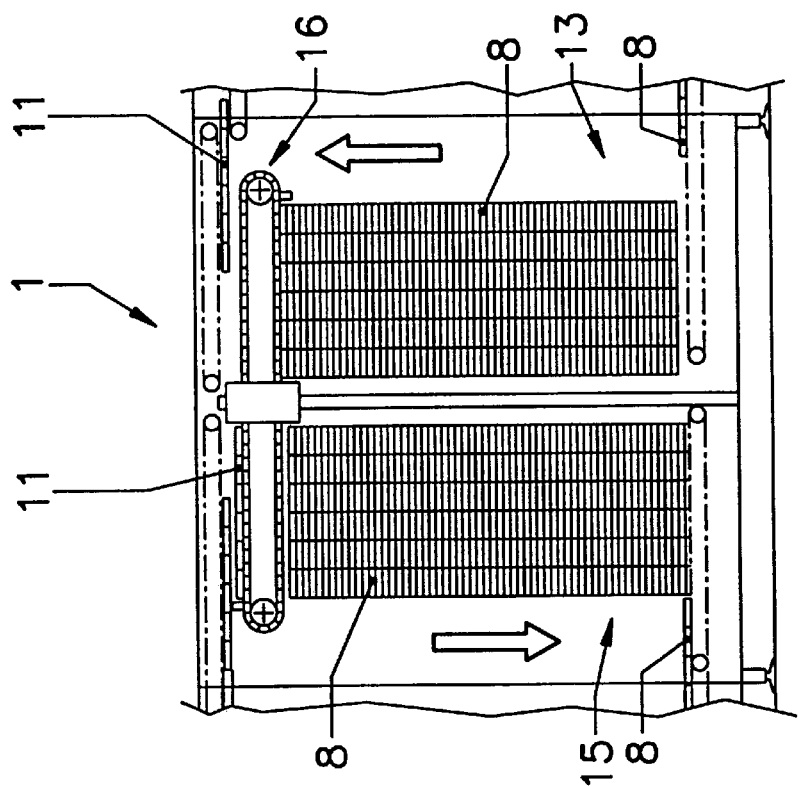
FIGS. 2 and 3 are respective partially cross-sectioned views illustrating two operating positions of the accumulator of FIG. 1.

Thus, the horizontal driving device 16 will start to be lowered with the same rate as the level of the full molds 8 in the downward vertical conveyors 15, thereby allowing a progressive emptying or evacuation of the amount accumulated in both said vertical conveyors 13, 15 up to a minimum allowed amount (FIG. 2).

Thus, in operation, said horizontal driving device 16, which is always active in this function, will be driven in a vertical direction to be always arranged at the height of the full mold 8 level, and will operate so as to cause said full mold 8 level to be the lowermost level, as shown in FIG. 2.

On the contrary, this accumulator control logic 1 will allow to provide an empty mold 11 level as high as possible.

What is claimed is:

1. An arrangement for conveying filled molds containing a product to a workstation, and for conveying empty molds free of the product away from the workstation, comprising:

a) a housing having lower and upper regions spaced apart along a vertical direction;

b) a first, lower conveyor and a second, lower conveyor spaced apart along a first horizontal axis perpendicular to the vertical direction, for conveying the filled molds through the lower region of the housing to the workstation;

c) a first, upper conveyor and a second, upper conveyor spaced apart along a second horizontal axis perpendicular to the vertical direction, for conveying the empty molds through the upper region of the housing away from the workstation;

d) an activatable transfer device having a lower loading zone and a lower discharge zone spaced apart along a horizontal direction perpendicular to the vertical direction to transfer filled molds between the first and second, lower conveyors, and an upper loading zone and an upper discharge zone spaced apart along the horizontal direction to transfer empty molds between the first and second, upper conveyors;

e) an up elevator for raising filled molds from the first, lower conveyor along a first vertical axis to the lower loading zone, and for raising empty molds from the upper discharge zone along the first vertical axis to the second, upper conveyor;

f) a down elevator for lowering filled molds from the lower discharge zone along a second vertical axis to the second, lower conveyor, and for lowering empty molds from the first, upper conveyor along the second vertical axis to the upper loading zone;

g) a first drive for lifting the transfer device in synchronism with the raising of the filled molds by the up elevator when the lower discharge zone is occupied with filled molds, and for maintaining the transfer device in a rest position when the lower discharge zone is vacant of filled molds; and h) a second drive for activating the transfer device in the rest position to transfer filled molds from the lower loading zone to the lower discharge zone, and to simultaneously transfer empty molds from the upper loading zone to the upper discharge zone.

2. The arrangement of claim 1, wherein each lower conveyor and each upper conveyor includes an endless loop element.

3. The arrangement of claim 1, wherein each elevator includes one pair of endless loop elements at one side of the housing, and another pair of endless loop elements at an opposite side of the housing, and wherein each pair of loop elements has a support for supporting a respective mold from below.

4. The arrangement of claim 1, wherein the transfer device includes a pair of endless carriers having pusher elements thereon for pushing the molds to the respective discharge zones during the activating of the transfer device.

5. The arrangement of claim 4, wherein the first drive includes a pair of threaded, vertical shafts, and a carriage threadedly mounted on the shafts for movement along the shafts, and wherein the endless carriers are mounted on the carriage.

6. The arrangement of claim 1, wherein the first drive includes a sensor for detecting whether filled molds are present at the lower discharge zone.

7. The arrangement of claim 1, wherein the first, lower conveyor extends into a confectionery product refrigerating workstation, and wherein the second, lower conveyor extends into a confectionery product releasing station in which the confectionery product is removed from a respective filled mold.

* * * * *